United States Patent [19]

Azuma

[11] Patent Number: 4,907,017

[45] Date of Patent: Mar. 6, 1990

[54] LASER OPTICAL APPARATUS

[75] Inventor: Jun Azuma, Tokyo, Japan

[73] Assignee: Canon Kabushiki Kaisha, Tokyo, Japan

[21] Appl. No.: 292,336

[22] Filed: Dec. 30, 1988

[30] Foreign Application Priority Data

Jan. 12, 1988 [JP] Japan ............................. 63-003038

[51] Int. Cl.[4] .................... G01D 9/42; G01D 15/14
[52] U.S. Cl. .................................... 346/108; 346/160
[58] Field of Search ................ 346/108, 107 R, 160, 346/76 L; 358/296, 300, 302

[56] References Cited

U.S. PATENT DOCUMENTS 4,788,560 11/1988 Miura ................................. 346/108
4,800,401  1/1989 Sato .................................... 346/108

*Primary Examiner*—Bruce A. Reynolds
*Assistant Examiner*—Scott A. Rogers
*Attorney, Agent, or Firm*—Fitzpatrick Cella Harper & Scinto

[57] ABSTRACT

A laser optical apparatus includes first laser emitting source for emitting a first laser beam, second laser emitting source for emitting a second laser beam, common deflector for deflecting both of the first laser beam and the second laser beam, wherein a direction in which the first laser beam is emitted from the first laser emitting source is substantially parallel with a direction in which the second laser beam is emitted from the second laser emitting source, and wherein the first laser emitting source and the second laser emitting source are disposed at positions different in the directions of the laser beams.

16 Claims, 3 Drawing Sheets

LASER OPTICAL APPARATUS

FIELD OF THE INVENTION AND RELATED ART

The present invention relates to a laser optical apparatus usable with a laser beam printer or the like wherein a member is scanned with a laser beam, more particularly to a laser optical apparatus wherein the member is scanned with a plurality of laser beams.

Recent development of the laser technique has made it possible to read or record an image by scanning a member with a laser beam, as in a laser beam printer or the like. It is considered that the member is scanned with a plurality of laser beams in order to increase the scanning speed or to superpose images into one combined image.

Referring first to FIG. 6, there is shown an example of such an apparatus wherein the member is scanned with plural laser beams. The apparatus shown in FIG. 6 is a laser beam printer provided with a laser optical apparatus 100. The laser optical apparatus comprises a light source which is a He-Ne laser device, a rotational polygonal mirror 102 for deflecting a laser beam emitted from the laser device 101, a photosensitive drum 103 which receives the beam deflected by the rotational polygonal mirror 102 to be scanned therewith and a detector for receiving a part of the scanning beam for each of the scans to detect the beam.

By the projection of the laser beam L1, an electrostatic latent image is formed. It is then developed by an unshown developing means, and then the photosensitive member is further exposed to another laser beam L2, and subsequently it is further developed.

The laser optical apparatus 100 further comprises an A-$\theta$ modulator 104 which serves to split a single laser beam into two beams, which are modulated independently from each other. The A-$\theta$ modulator 104 applies ultrasonic waves having different frequencies to produce one-order refraction beams corresponding to the respective waves.

In this system, there are limitations to the frequency of the ultrasonic wave applied and to a diameter of the beam produced by the He-Ne laser device 101. In addition, the angle between the two beams is normally 5.6 mrad, approximately, at maximum. In consideration of these, the angle between the two beams are expanded by a lens 105 and are made parallel. Subsequently they are incident on the rotational polygonal mirror 102.

On the other hand, a small size and less expensive semiconductor laser has become widely used in place of the He-Ne laser device. An apparatus wherein the photosensitive member is scanned with two laser beams, using two semiconductor lasers, is considered.

FIG. 7 shows an example, wherein the semiconductor lasers 106 are disposed perpendicular to each other with the use of a prism mirror 108 in order to provide sufficient space for mounting of the semiconductor lasers 106, its base plates, heat sinks (not shown) and collimator lenses 107. By the use of the prism mirror 108, the two beams can be closely disposed, so that the thickness of the polygonal mirror 109 can be reduced. If the two laser beams are incident on the f-$\theta$ lens 110 at positions out of the optical axis thereof, the scanning lines are curved, and therefore, the interval between the two laser beams is required to be small. From this standpoint, the beams are also required to be close to each other. In this Figure, the reference numeral 111 depicts a photosensitive drum; 112, a recording sheet of paper; 113, a first emitting beam; and 114, a second emitting beam.

In the foregoing, the two laser beams are used for combining images, but it is possible to scan the member to be scanned at a higher speed by using plural laser beams.

For example, a polygonal mirror of an ultra-high speed laser beam printer capable of printing 100 sheets (A4 size) per minutes is rotated at a rotational speed of more than 30,000 rpm. In order to safely rotate the polygonal mirror at such a high speed, the bearing for the motor driving the polygonal mirror is required to be an expensive air bearing type. However, if the printing is carried out with three beams, the rotational speed of the motor may be one third. It will be understood that the printing speed of the laser beam printer is increased by using plural beams. In this case, the second and third beams are required to be projected onto the photosensitive drum very close to the first beam, and therefore, the plural beams are required to be disposed very closely one another. This necessitates use of an optical element such as a prism 108 or the like shown in FIG. 7, too.

The laser scanning optical apparatus 100 using the He-Ne laser apparatus 101 and the A-$\theta$ modulator 104 as shown in FIG. 6 requires a beam separating lens 105. It also involves a problem that a He-Ne laser apparatus 101 and the A-$\theta$ modulator 104 are expensive and that the scanning optical apparatus is bulky.

On the other hand, the optical scanning apparatus 115 using two semiconductor lasers 106 and 106 as the light source and a prism mirror 108 for permitting close arrangement of the two beams, as shown in FIG. 7, requires a high mounting accuracy of the prism mirror 108 to such an extent that some measurement against vibration is necessitated to confine non-uniform positional deviation of the scanning line attributable to transmission of the vibration of the motor or the like to the prism mirror 108. Also, the prism mirror 108 itself is expensive.

SUMMARY OF THE INVENTION

Accordingly, it is a principal object of the present invention to provide a laser optical apparatus wherein plural beams can be arranged close to each other without use of a special optical element.

It is another object of the present invention to provide a laser optical apparatus wherein positions of plural laser emitting means are made different in the direction of the emitted laser beams.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
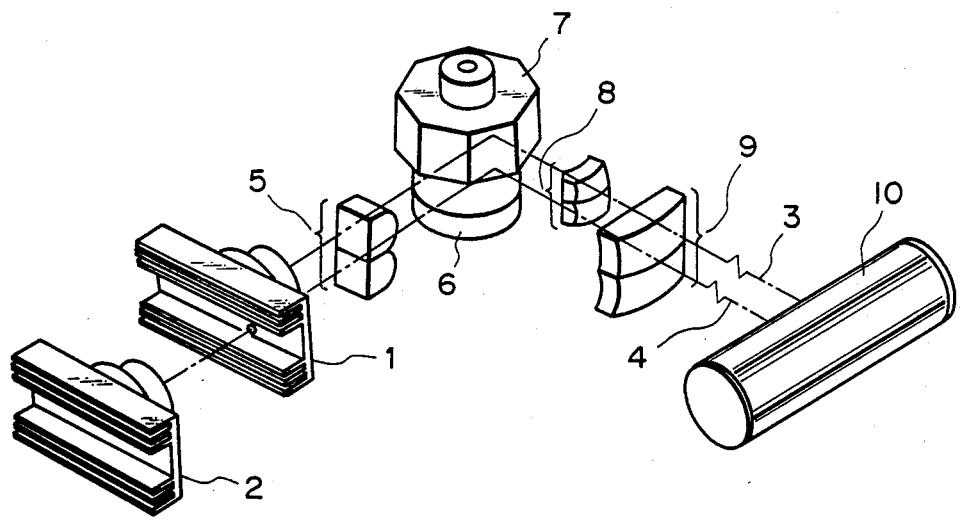
FIG. 1 is a perspective view of a laser optical apparatus according to an embodiment of the present invention.

Referring to Figures, the preferred embodiments of the present invention will be described in conjunction with the accompanying drawings wherein the same reference numerals are assigned to the members having corresponding functions.

Referring now to FIG. 1, there is shown a laser beam printer which is an exemplary laser optical apparatus according to an embodiment of the present invention. The apparatus comprises a beam emitting units 1 and 2 functioning as a beam source. The beam emitting unit 2 is disposed behind the beam emitting unit 1. The beam emitting units 1 and 2 produce beams 3 and 4, respectively. The emitted beams 3 and 4 are passed through cylindrical lenses 5. Downstream of the cylindrical lens 5 with respect to the direction of the light travel, there is disposed a polygonal mirror 7 for scanning both of the emitted beams 3 and 4. The polygonal mirror 7 is rotated by a driving motor 6. Downstream of the polygonal mirror 7, there are disposed a spherical lenses 8 and toric lenses 9. The beams 3 and 4 outgoing from the toric lens 9 is incident on a photosensitive drum 10.

Figure 2:
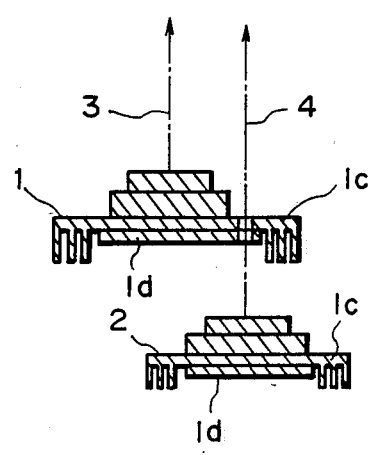
FIG. 2 is a sectional view of a beam emitting unit used with the embodiment of FIG. 1.
Figure 3:
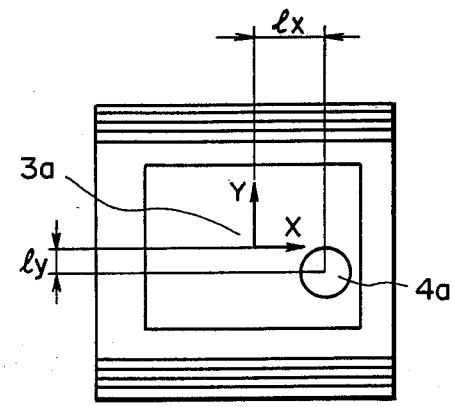
FIG. 3 is a rear view of the beam emitting unit of FIG. 2.
Figure 4:
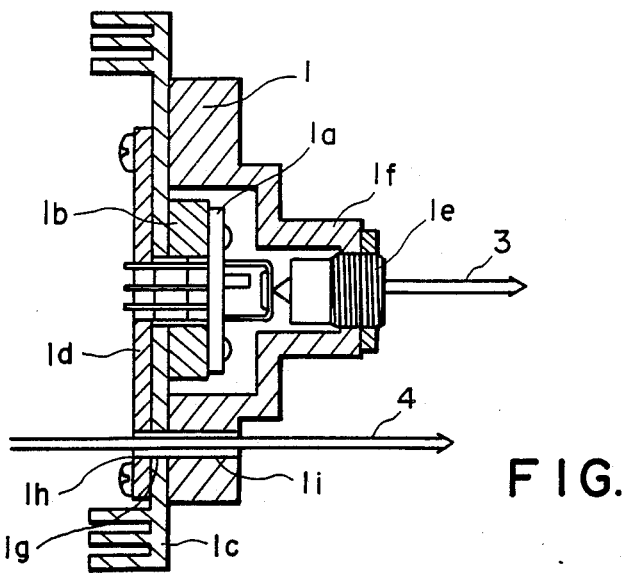
FIG. 4 is an enlarged sectional view of the beam emitting unit shown in FIGS. 2 and 3.

FIGS. 2, 3 and 4 illustrate details of the beam emitting unit 1. Referring particularly to FIG. 4, a semiconductor laser 1a is mounted on a temperature controlling member 1b for cooling the semiconductor laser 1a, and the temperature controlling member 1b is mounted on a heat sink 1c for heat radiation. On the backside of the heat sink 1c, there is an electric substrate 1d for driving the semiconductor laser 1a and the temperature controller 1b. Designated by a reference 1e is a lens barrel for the collimator lens for collimating the beam from the semiconductor laser 1a. The barrel 1e is supported by a holder 1f so as to enclose the semiconductor laser 1a and the temperature controlling member 1b.

In order to allow passage of the emitted beam 4 from the beam emitting unit 2, the electric substrate 1d, the heat sink 1c and the holder 1f are provided with through holes 1h, 1g and 1i, respectively. In the arrangement described above, the beam 3 is emitted from the beam emitting unit 1, and the beam 4 is emitted from the beam emitting unit 2. The beams 3 and 4 are directed to the photosensitive drum 10 through the cylindrical lens 5, the polygonal mirror 7, the spherical lens 8 and the toric lens 9. The beam 4 emitted from the backside beam emitting unit 2 is passed through the holes 1h, 1g and 1i formed at positions close to the beam 3 emitted from the beam emitting unit 1, whereby the interval between the emitted beam 3 and the emitted beam 4 can be reduced.

In other words, the beam emitting units are disposed parallel to each other and at different positions in the direction of the emitted beams, by which the two laser beams can be made close to each other without necessity of using a special optical element.

Since the positions of the beam emitting units 1 and 2 are different in the direction of their optical axes, the optical path length are different. In view of this, it is preferable for the beam emitting units to produce collimated laser beams.

In this embodiment, the front side beam emitting unit 1 which is closer to the polygonal mirror is provided with a transmitting portion for allowing transmittance of the laser beam 4 produced by the back side laser emitting unit 2, by which the two laser beams can be made further closer, and by which a large size beam emitting unit can be used.

The transmitting portion may be in the form of a through hole from the standpoint of easy manufacturing.

In this embodiment, a plane commonly including the optical axes of the laser emitting units 1 and 2 is perpendicular to the main scanning direction, that is, a plane in which the beams are deflected by the polygonal mirror. This is done so as to align the positions where the writings start in the main scanning direction. However, the direction is not limited to this, if detectors for horizontal synchronization signals for the beams 3 and 4 are placed at different proper positions.

In this embodiment, the imaging lenses 5, 8 and 9 are in the form of two stage structure for the purpose of preventing curvature of the scanning line from occurring, but one lens is usable for each of the imaging lenses 5, 8 and 9 if the interval between the beams 3 and 4 is sufficiently small.

In this embodiment, the through holes 1h, 1g and 1i are circular, but it may be slit-like, a channel-like or other suitable form.

By covering the hole or holes with an ND filter or filters, the quantity of light can be adjusted. By use of an SHG element, the wavelength can be controlled when the light source is a laser.

Figure 5:
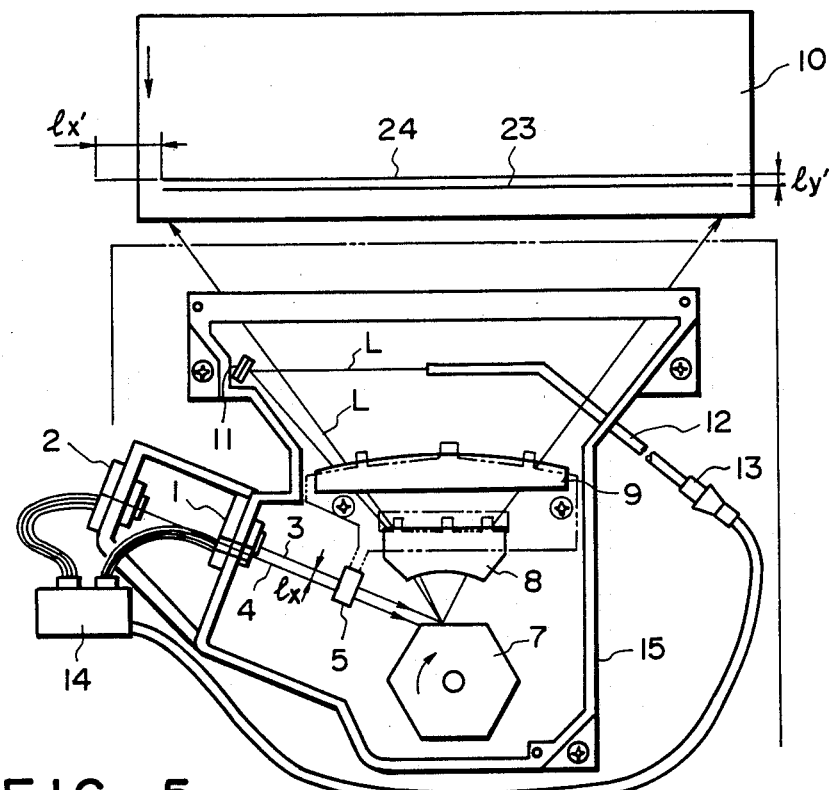
FIG. 5 is a top plan view of a printer incorporating a laser scanning optical apparatus according to a second embodiment of the present invention.
Figure 6:
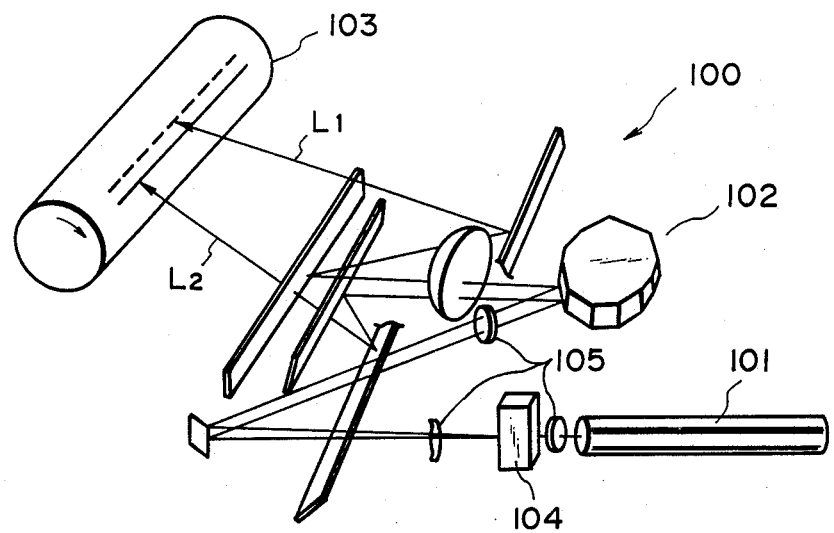
FIG. 6 is a perspective view illustrating a conventional laser optical apparatus.
Figure 7:
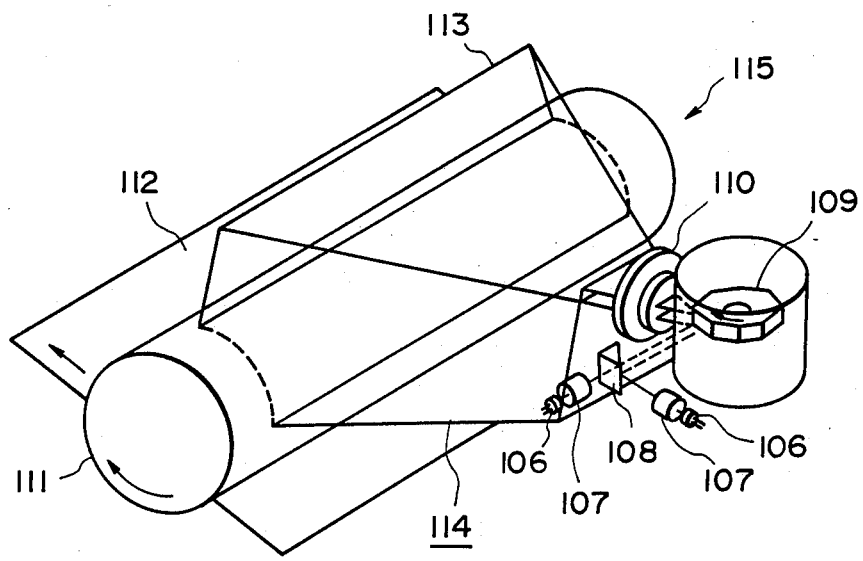
FIG. 7 is a perspective view of an example of a laser optical apparatus.

Referring to FIG. 5, the description will be made as to another embodiment wherein the optical axes of the beam emitting units 1 and 2 are not perpendicular to the direction of the laser beam deflection by the deflecting means. FIG. 5 is a top plan view of the apparatus of this embodiment. The apparatus comprises a reflecting mirror, optical fibers 12, a light receiving sensor 13, a control circuit responsive to a signal from the light receiving sensor 14 to control timing of modulation by beam emitting units 1 and 2, and a housing of the scanning optical unit 15.

Referring to FIG. 3, the description will be made as to the positional relation between the beam emitting unit 1 and the beam emitting unit 2, taking as a reference point a beam emitting point 3a of the beam 3 from the beam emitting unit 1. An emitting point 4a of the beam 4 by the beam emitting unit 2 away from the reference point by lx in the X-direction and by ly in the Y-direction. The deviation ly is so determined that the two beams are imaged on the photosensitive drum 10 as continuous points or a line through the imaging lenses 5, 8 and 9 and the polygonal mirror 7. Assuming, for example, that the imaging magnification provided by the imaging lenses 5, 8 and 9 is 20, and that the resolution ly' on the photosensitive drum 10 is 10/mm, $$ly = (1/10) \times (lx/20) = 5 \text{ (microns)}$$

The distance lx is limited by the semiconductor laser 1a contained in the beam emitting unit 1 and the collimator lens barrel 1e, more particularly, it is limited to approximately 5 mm.

If the scanning operation is effected with this structure, the positions where a line 24 written by the beam 4 and a line 23 written by the beam 3 start, are deviated. To obviate this, delaying means may be provided to delay the writing starting position of the beam 4. An example of the delaying means will be described. The beam 3 from the beam emitting unit 1 travels by way of the mirror 7, the lenses 5, 8 and 9 and the reflecting mirror 11 to reach the photosensor 13. An output of the photosensor 13 is transmitted to the control circuit 14 as a horizontal synchronization signal. The control circuit 14 delays modulation of the beam emitting unit 2 for a period of time corresponding to the delaying distance lx' so as to align the writing starting positions of the beams 3 and 4.

By the simultaneously writings using two beams 3 and 4, the printing speed is doubled, so that a high speed printer can be easily manufactured.

According to this embodiment, the elements required for the horizontal synchronization signal (the reflecting mirror 11, the optical fibers 12, the photosensitive 13) are constituted as a unit, whereby the number of parts can be decreased with the result of lower cost of the apparatus.

As described, according to the present invention, the plural beams can be disposed closer, thus eliminating the necessity of an optical element such as an expensive prism mirror or the like, and therefore, a highly reliable optical scanning apparatus which is compact can be provided.

While the invention has been described with reference to the structures disclosed herein, it is not confined to the details set forth and this application is intended to cover such modifications or changes as may come within the purposes of the improvements or the scope of the following claims.

What is claimed is:

1. A laser optical apparatus, comprising:
   first laser emitting means for emitting a first laser beam;
   second laser emitting means for emitting a second laser beam;
   common deflecting means for deflecting both of the first laser beam and the second laser beam;
   wherein a direction in which the first laser beam is emitted from said first laser emitting means is substantially parallel with a direction in which the second laser beam is emitted from the second laser emitting means, and wherein said first laser emitting means and said second laser emitting means are disposed at positions different in the directions of the laser beams.

2. An apparatus according to claim 1, wherein said first and second laser emitting means emits collimated laser beams.

3. An pparatus according to claim 2, wherein said first and second laser emitting means constitute a laser unit with sources of the laser beams and collimator lens means.

4. An apparatus according to claim 3, wherein said second laser unit is disposed behind said first laser unit, and said first laser unit is provided with a transmitting portion for allowing transmittance therethrough of the second laser beam from said second laser unit.

5. An apparatus according to claim 4, wherein said transmitting portion is a through hole formed in said first laser unit.

6. An apparatus according to claim 1, wherein said laser optical apparatus is used in a laser beam printer, and the laser beam deflected by said deflecting means scans a movable photosensitive member.

7. An apparatus according to claim 1, wherein optical axes of said first laser emitting means and said second laser emitting means are perpendicular to a plane in which the laser beams are deflected by said deflecting means.

8. A laser optical apparatus, comprising:
   first laser emitting means for emitting a first laser beam;
   second laser emitting means for emitting a second laser beam;
   common deflecting means for detecting both of the first laser beam and the second laser beam;
   a casing for accommodating said deflecting means, wherein said first laser emitting means and said second laser emitting means are mounted to said casing;
   wherein a direction in which the first laser beam is emitted from said first laser emitting means is substantially parallel with a direction in which the second laser beam is emitted from said second laser emitting means, and wherein said casing includes first supporting portion for supporting said first laser emitting means and a second supporting portion for supporting said second laser emitting means, the first and second supporting portions being disposed at positions which are different in the laser beam emitting directions.

9. An apparatus according to claim 8, wherein said casing accommodates imaging lens means for imaging the laser beams deflected by said deflecting means.

10. An apparatus according to claim 9, wherein said deflecting means includes a reflecting mirror rotatable in one direction, and said imaging lens means has an f-$\theta$ property.

11. An apparatus according to claim 8, wherein said first and second laser emitting means emits collimated laser beams.

12. An apparatus according to claim 11, wherein said first and second laser emitting means constitute a laser unit with sources of the laser beams and collimator lens means.

13. An apparatus according to claim 12, wherein said second laser unit is disposed behind said first laser unit, and said first laser unit is provided with a transmitting portion for allowing transmittance therethrough of the second laser beam from said second laser unit.

14. An apparatus according to claim 13, wherein said transmitting portion is a through hole formed in said first laser unit.

15. An apparatus according to claim 8, wherein said laser optical apparatus is used in a laser beam printer, and the laser beam deflected by said deflecting means scans a movable photosensitive member.

16. An apparatus according to claim 8, wherein optical axes of said first laser emitting means and said second laser emitting means are perpendicular to a plane in which the laser beams are deflected by said deflecting means.

* * * * *